US011907900B2

(12) United States Patent
Uchimura

(10) Patent No.: US 11,907,900 B2
(45) Date of Patent: Feb. 20, 2024

(54) INVENTORY MANAGEMENT SERVER, INVENTORY MANAGEMENT SYSTEM, INVENTORY MANAGEMENT METHOD, AND RECORDING MEDIUM

(71) Applicant: NEC Corporation, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 17/423,610

(22) PCT Filed: Mar. 10, 2020

(86) PCT No.: PCT/JP2020/010159
§ 371 (c)(1),
(2) Date: Jul. 16, 2021

(87) PCT Pub. No.: WO2020/195765
PCT Pub. Date: Oct. 1, 2020

(65) Prior Publication Data
US 2022/0114538 A1    Apr. 14, 2022

(30) Foreign Application Priority Data

Mar. 22, 2019  (JP) ................................. 2019-054690

(51) Int. Cl.
*G06F 17/00* (2019.01)
*G06Q 30/06* (2023.01)
(Continued)

(52) U.S. Cl.
CPC ... *G06Q 10/087* (2013.01); *G06Q 10/063114* (2013.01)

(58) Field of Classification Search
CPC ...................... G06Q 10/087; G06Q 10/063114
See application file for complete search history.

(56) References Cited

U.S. PATENT DOCUMENTS 6,965,871 B1 *  11/2005  Szabo ................ G06Q 30/0603
                                                            705/26.8
7,894,938 B1 *   2/2011  Arora ...................... G07F 9/026
                                                            705/28
(Continued)

FOREIGN PATENT DOCUMENTS

JP     2007-233518 A    9/2007
JP     2012-164055 A    8/2012
(Continued)

OTHER PUBLICATIONS

International Search Report for PCT Application No. PCT/JP2020/010159, dated Jun. 16, 2020.
(Continued)

*Primary Examiner* — Talia F Crawley

(57) ABSTRACT

An inventory management server according to one aspect of the present disclosure comprises: a memory; and at least one processor coupled to the memory, the at least one processor performing operations to: generate expiration information including information for specifying a product and information for specifying a branch store that sells the product based on a stock quantity of the product in the branch store in which an employee of a flagship store replaces a plurality of products and a sell-by date of the product; set a timing to transmit the expiration information to a store terminal based on at least either a movement time or a movement distance from a position of the employee to the branch store that sells the product, and the sell-by date related to the product; and notify the store terminal of the expiration information based on the set timing.

7 Claims, 9 Drawing Sheets

(51) Int. Cl.
*G06Q 10/087* (2023.01)
*G06Q 10/0631* (2023.01)

(56) References Cited

U.S. PATENT DOCUMENTS

| | | | | |
|---|---|---|---|---|
| 11,397,906 B1* | 7/2022 | Fillebeen | | G06Q 10/04 |
| 2002/0139838 A1* | 10/2002 | Goodwin, III | | G06Q 30/06 |
| | | | | 235/375 |
| 2004/0117196 A1* | 6/2004 | Brockman | | G06Q 40/12 |
| | | | | 705/332 |
| 2009/0043617 A1* | 2/2009 | Thomas | | G06Q 10/087 |
| | | | | 705/28 |
| 2010/0187306 A1* | 7/2010 | Solomon | | B65G 1/127 |
| | | | | 235/385 |
| 2011/0153614 A1* | 6/2011 | Solomon | | B65G 1/127 |
| | | | | 707/769 |
| 2013/0138656 A1* | 5/2013 | Wheaton | | G06Q 30/06 |
| | | | | 709/219 |
| 2014/0006229 A1* | 1/2014 | Birch | | G06Q 10/087 |
| | | | | 705/28 |
| 2014/0089077 A1* | 3/2014 | Zuckerman | | G07F 17/0064 |
| | | | | 705/26.8 |
| 2015/0120514 A1* | 4/2015 | Deshpande | | G06Q 30/016 |
| | | | | 705/28 |
| 2018/0114257 A1* | 4/2018 | Conville | | G06Q 30/0283 |
| 2019/0012721 A1* | 1/2019 | Fujita | | G06K 7/10297 |
| 2019/0066181 A1* | 2/2019 | Victorin | | G06Q 10/087 |
| 2019/0102788 A1* | 4/2019 | Lewis | | G06Q 30/0206 |
| 2019/0266554 A1* | 8/2019 | Lin | | G06Q 10/087 |
| 2019/0272557 A1* | 9/2019 | Smith | | G06Q 10/087 |
| 2020/0019923 A1* | 1/2020 | Santhar | | G06Q 10/0838 |
| 2020/0043108 A1* | 2/2020 | Faigin | | G06Q 10/087 |
| 2020/0242541 A1* | 7/2020 | Kinno | | G06Q 30/06 |
| 2020/0242877 A1* | 7/2020 | Velten | | A61L 2/10 |
| 2021/0174665 A1* | 6/2021 | Shoari | | G08B 21/245 |

FOREIGN PATENT DOCUMENTS

| | | |
|---|---|---|
| WO | 2018/061057 A1 | 4/2018 |
| WO | 2018/159132 A1 | 9/2018 |

OTHER PUBLICATIONS

English translation of Written opinion for PCT Application No. PCT/JP2020/010159, dated Jun. 16, 2020.

* cited by examiner

Fig. 3

| | PRODUCT ID | TOTAL STOCK QUANTITY | FIRST SELL-BY DATE | STOCK QUANTITY | SECOND SELL-BY DATE | STOCK QUANTITY |
|---|---|---|---|---|---|---|
| STORE 1A | D | 10 | 2019/3/1 12:00 | 5 | 2019/3/2 12:00 | 5 |
| | E | 5 | 2019/3/1 9:00 | 2 | 2019/3/2 9:00 | 3 |
| | F | 20 | 2019/3/1 17:00 | 10 | 2019/3/2 17:00 | 10 |
| STORE 1B | D | 15 | 2019/3/1 12:00 | 0 | 2019/3/2 12:00 | 15 |
| ... | ... | ... | ... | ... | ... | ... |

121

INVENTORY MANAGEMENT SERVER, INVENTORY MANAGEMENT SYSTEM, INVENTORY MANAGEMENT METHOD, AND RECORDING MEDIUM

This application is a National Stage Entry of PCT/JP2020/010159 filed on Mar. 10, 2020, which claims priority from Japanese Patent Application 2019-054690 filed on Mar. 22, 2019, the contents of all of which are incorporated herein by reference, in their entirety.

TECHNICAL FIELD

The present disclosure relates to an inventory management server, an inventory management system, an inventory management method, and an inventory management program.

BACKGROUND ART

In the retail industry, inventory management of products in a store is necessary in order to reduce opportunity loss. Among the products, a product having a sell-by date (expiration date, best before date, or the like), particularly a product having a short sell-by date requires frequent management of the sell-by date. As a method of managing products having a sell-by date, PTL 1 discloses a technique for grasping a product whose sell-by date is approaching in real time to perform freshness management in a selling area.

CITATION LIST

Patent Literature

[PTL 1] JP 2012-164055 A

SUMMARY OF INVENTION

Technical Problem

However, PTL 1 described above does not disclose a technique of managing the inventory of a normal store where an employee is stationed and the inventory of a labor-saving store or the like where no employee monitoring the inventory of products is present.

One object of the present disclosure is to provide an inventory management server or the like for solving the above-described problem and efficiently performing inventory management of products in a store such as a labor-saving store.

Solution to Problem

An inventory management server according to one aspect of the present disclosure includes:
 a generation unit that generates expiration information including information for specifying a product and information for specifying a branch store that sells the product based on a stock quantity of the product in the branch store in which an employee of a flagship store replaces a plurality of products and a sell-by date of the product;
 a timing setting unit that sets a timing to transmit the expiration information to a store terminal based on at least either a movement time or a movement distance from a position of the employee to the branch store that sells the product, and the sell-by date related to the product; and
 a notification unit that notifies the store terminal of the expiration information based on the set timing.

An inventory management system according to one aspect of the present disclosure includes:
 a first server that manages an inventory of a flagship store;
 a second server that manages an inventory of a branch store in which an employee of the flagship store replaces a plurality of products; and
 a store terminal,
 in which the second server is communicably connected to the store terminal, and
 the second server includes a generation unit that generates expiration information including information for specifying a product and information for specifying a branch store that sells the product based on a stock quantity of the product in the branch store in which the employee of the flagship store replaces a plurality of products and a sell-by date of the product, a timing setting unit that sets a timing to transmit the expiration information to a store terminal based on at least either a movement time or a movement distance from a position of the employee to the branch store that sells the product, and the sell-by date related to the product, and a notification unit that notifies the store terminal of the expiration information based on the set timing.

An inventory management method according to one aspect of the present disclosure includes:
 generating expiration information including information for specifying a product and information for specifying a branch store that sells the product based on a stock quantity of the product in the branch store in which an employee of a flagship store replaces a plurality of products and a sell-by date of the product;
 setting a timing to transmit the expiration information to a store terminal based on at least either a movement time or a movement distance from a position of the employee to the branch store that sells the product, and the sell-by date related to the product; and
 notifying the store terminal of the expiration information based on the set timing.

An inventory management program according to one aspect of the present disclosure causes a computer to execute:
 generating expiration information including information for specifying a product and information for specifying a branch store that sells the product based on a stock quantity of the product in the branch store in which an employee of a flagship store replaces a plurality of products and a sell-by date of the product;
 setting a timing to transmit the expiration information to a store terminal based on at least either a movement time or a movement distance from a position of the employee to the branch store that sells the product, and the sell-by date related to the product; and
 notifying the store terminal of the expiration information based on the set timing.

The inventory management program may be stored in a non-transitory computer-readable recording medium.

Advantageous Effects of Invention

An effect of the present disclosure is that inventory management can be efficiently performed in a specific store such as a labor-saving store.

BRIEF DESCRIPTION OF DRAWINGS

FIG. 3 is a diagram illustrating an example of data of inventory information stored in an inventory storage unit.

EXAMPLE EMBODIMENT

Figure 1:
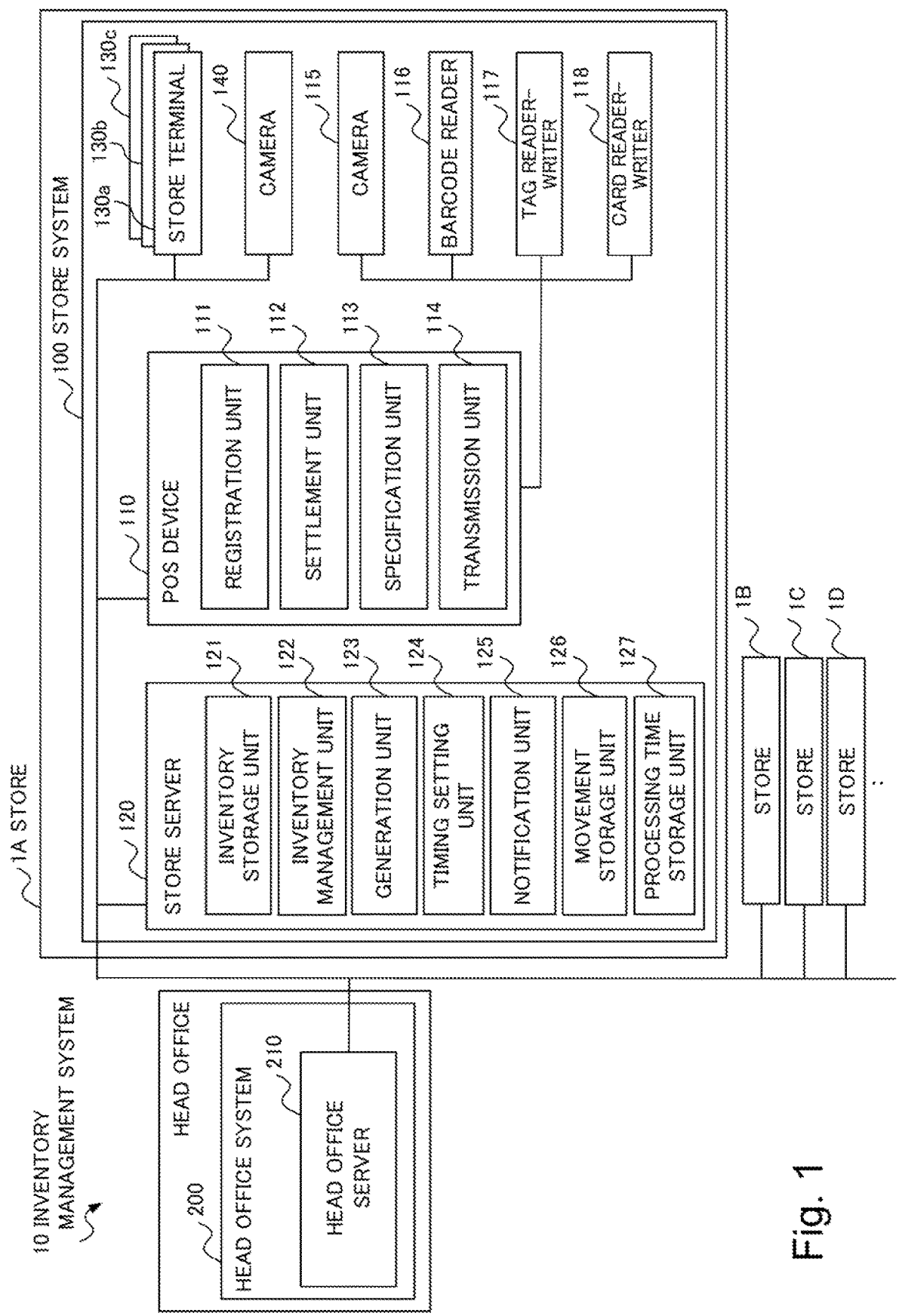
FIG. 1 is a block diagram illustrating a configuration of an inventory management system in a first example embodiment.

In the retail industry, for the purpose of improving operation efficiency and expanding to small trading zones, introduction of labor-saving or unmanned stores (hereinafter these are collectively referred to as "labor-saving stores") has been promoted in which, for example, work of employees related to registration and settlement of products being purchased as well as customer service support, in-store monitoring, inventory management, facility management, and the like is reduced with a computer system, and the number of stationed employees is reduced or eliminated.

Generally, the labor-saving stores are smaller in size and have limited floor areas than normal stores. Unlike the normal stores located along public roads in urban areas and suburban areas, these labor-saving stores may be located also in, for example, specific places such as office buildings, factories, station premises, hotels, and apartment buildings.

Even in such a labor-saving store, inventory management of products in the store is necessary in order to reduce the loss of sales opportunities. In particular, among the products, a product having a sell-by date (expiration date, best before date, or the like), particularly a product having a short sell-by date requires frequent management of the sell-by date. Accordingly, there is a need for a technique by which an employee of a normal store manages the inventory of products with a short sell-by date in the normal store where the employee is stationed and the inventory of products with a short sell-by date in the labor-saving store where no employee monitoring the inventory of products is stationed. In the following example embodiment, an inventory management server and the like for an employee of a normal store to efficiently perform inventory management of products with a short sell-by date in a store such as a labor-saving store will be described.

Hereinafter, example embodiments will be described in detail with reference to the drawings. Note that in the drawings and the example embodiments described in the description, the same reference numerals are given to similar components, and the description thereof will be omitted as appropriate.

First Example Embodiment

A first example embodiment will be described.

First, a configuration of an inventory management system according to the first example embodiment will be described. FIG. 1 is a block diagram illustrating a configuration of an inventory management system 10 according to the first example embodiment. Referring to FIG. 1, the inventory management system 10 includes a plurality of store systems 100 and a head office system 200. For example, the store system 100 is installed in each of stores 1A, 1B, 1C, and 1D (hereinafter collectively referred to as store 1) of a chain of convenience stores, supermarkets, or the like in the retail industry. The head office system 200 is installed, for example, in the head office of the chain. The store system 100 and the head office system 200 of each store 1 are connected by, for example, a communication network. The head office system 200 includes a head office server 210, and the head office server 210 performs product management, inventory management, and the like of the entire store.

Figure 2:
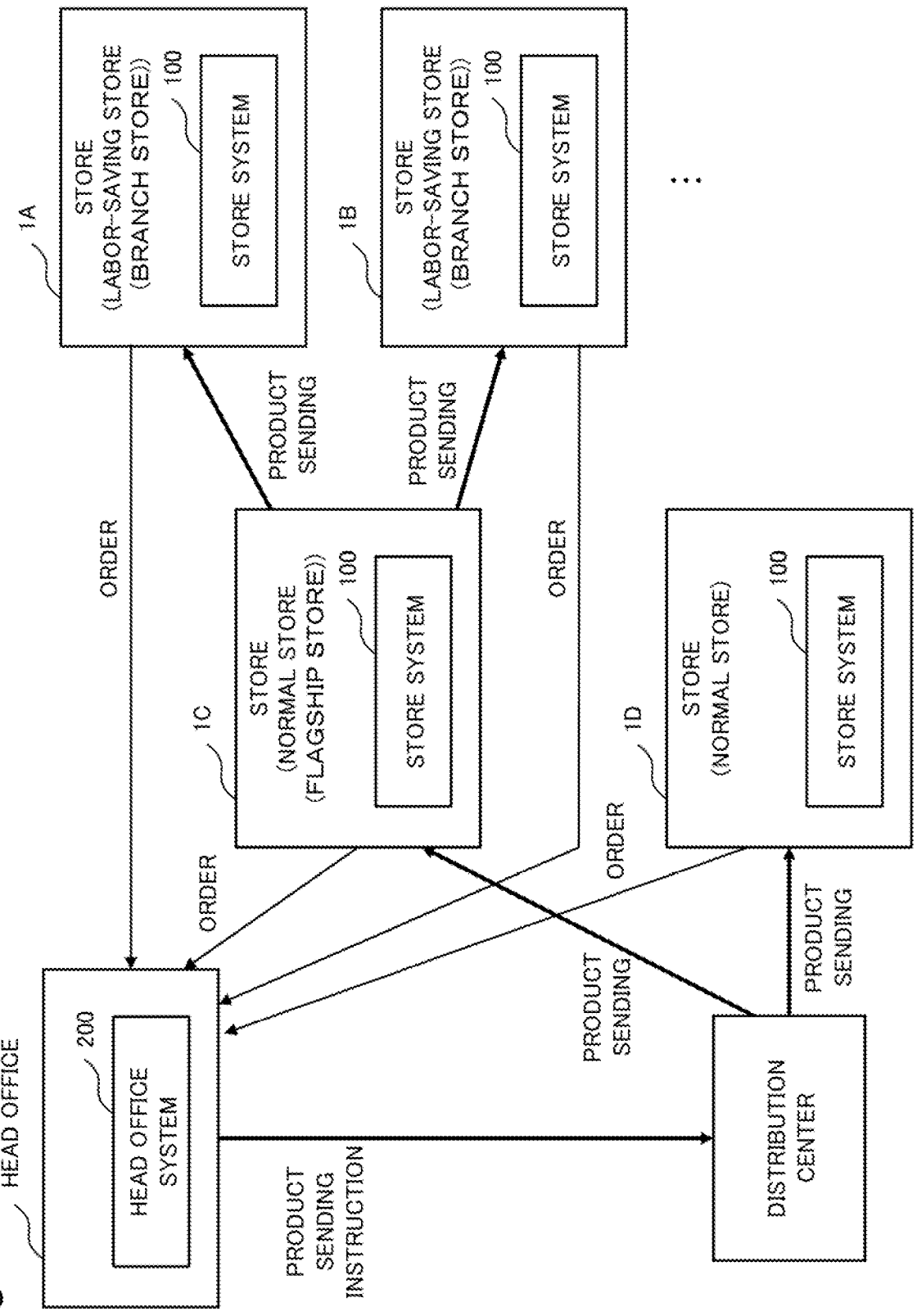
FIG. 2 is a diagram illustrating an example of a relationship among stores in the first example embodiment.

The store 1 may include a normal store and a labor-saving store. FIG. 2 is a diagram illustrating an example of a relationship between stores in the first example embodiment. The labor-saving store is a store in which, for example, at least a part of work of employees related to registration and settlement of products being purchased as well as customer service support, in-store monitoring, inventory management, facility management, and the like is reduced with a computer system as compared with the normal store in the chain or the like. The floor area of the labor-saving store may be smaller than that of the normal store.

The normal store may manage a nearby labor-saving store. Here, the normal store that manages the labor-saving store is referred to as a flagship store (hereinafter also described as "normal store (flagship store)"), and the labor-saving store managed by the flagship store is referred to as a branch store (hereinafter also referred to as "labor-saving store (branch store)"). The normal store (flagship store) and the labor-saving store (branch store) may be located on different floors or the like in the same building, or may be located in different nearby buildings.

The store system 100 of a normal store or a labor-saving store places an order with the head office system 200 for products to replenish the stock of the own store. The head office system 200 transmits a delivery instruction of a product to be delivered to the store to a distribution center or the like. The distribution center or the like delivers the product instructed by the head office system 200 to each store 1. Here, the product of the labor-saving store (branch store) is once delivered to the normal store (flagship store) together with a product of the normal store (flagship store). Then, the product of the labor-saving store (branch store) is delivered from the normal store (flagship store) to the labor-saving store (branch store) by, for example, an employee or the like of the normal store (flagship store).

In the labor-saving store (branch store), for example, an employee of the normal store (flagship store) stays as necessary for taking out delivered products, collecting expired products, cleaning the store, maintenance of equipment, and replenishing and collecting cash. The labor-saving store (branch store) may be a store in which a minimum number of employees is stationed, or may be an unattended store having a time zone in which no employee is present (no employee is stationed).

The labor-saving store may be managed by the head office instead of the flagship store. The products of the labor-saving store may be directly delivered from the distribution center to the labor-saving store. Products to be assorted in the labor-saving store (branch store) may be ordered by the store system 100 of the normal store (flagship store) instead of the labor-saving store (branch store).

In the example of FIG. 2, the stores 1A and 1B are labor-saving stores (branch stores), the store 1C is a normal store (flagship store), and the store 1D is another normal store. However, the present invention is not limited thereto, and the stores 1A to 1D may be normal stores, or the stores 1A to 1D may be labor-saving stores.

Referring to FIG. 1, the store system 100 includes a point of sale (POS) device 110, a store server (also referred to as an inventory management server) 120, store terminals 130*a*, 130*b*, and 130*c* (hereinafter described as store terminals 130*a* to 130*c*), and a camera 140.

The store terminals 130*a* to 130*c* are portable communication terminals provided to employees. Each of the store terminals 130*a* to 130*c* is a portable computer, and includes at least an operation unit and a display unit (both not illustrated). The store terminals 130*a* to 130*c* may be touch panel type tablet terminals, or may be devices including a display device on a display unit and physical buttons on an operation unit. The store terminals 130*a* to 130*c* transmit and receive inventory information and the like to and from the store server 120 of the own store 1 according to an operation on the operation unit by an employee, and display the inventory information on the display unit. Further, when an expired product replacement request or the like to the employee is received from the head office system 200 or the store server 120, an indication thereof is displayed on the display unit. In addition, the display units of the store terminals 130*a* to 130*c* may display various types of information for notifying an employee of an instruction or a message. A call function may be provided. Since the store terminals 130*a* to 130*c* are provided to the employees, the store terminals are necessary components in the flagship store 1C where the employee is stationed, but are not necessary components in the branch stores 1A and 1B where no employee is stationed. In the branch stores 1A and 1B, the employee may carry the store terminal 130*a* to 130*c* of the flagship store 1C and perform product replacement processing, or may perform the product replacement processing using the store terminals 130*a* to 130*c* provided in the branch stores 1A and 1B.

The camera 140 is a camera that is installed in a store and captures an image of the inside of the store. A plurality of cameras 140 may be present in one store.

The POS device 110 performs a payment process (for example, reading and registering a barcode or the like of a product in a shopping list, and performing a settlement of the product in the shopping list) when a customer who has visited the store 1 purchases the product. The POS device 110 may specify an identifier (ID) for identifying a customer who purchases a product.

For example, the registration and settlement of a product may be in the form of being performed by an operation of an employee of the store 1, or in the form of being performed by an operation of a customer. The registration of a product may be in the form of being performed by an operation of the employee of the store 1, and the settlement may be in the form of being performed by an operation of a customer.

The POS device 110 includes a registration unit 111, a settlement unit 112, a specification unit 113, and a transmission unit 114. The POS device 110 may be connected with a camera 115, a barcode reader 116, a tag reader-writer 117, and a card reader-writer 118.

The registration unit 111 registers a product to be purchased by a customer. Here, for example, the registration unit 111 instructs the camera 115 or the barcode reader 116 connected to the POS device 110 to read a two-dimensional code such as a QR code (registered trademark) or a barcode representing the product ID given to the product, further specifies the product based on data of the read two-dimensional code or barcode, and registers the product in the shopping list. Similarly, the registration unit 111 may cause the tag reader-writer 117 to read an IC tag given to the product and having a product ID written therein, thereby specifying the product and registering the product in the shopping list. The registration unit 111 may specify the product by image recognition using a product image captured by the camera 115 and register the product in the shopping list. The registration unit 111 may specify the product removed from a product shelf or the like by a customer by image recognition from an image of the inside of the store captured by another camera 140 installed in the store 1, and register the product in the shopping list. The registration unit 111 outputs information of the registered product to the settlement unit 112. When the registration unit 111 receives a notification of an expired product from an inventory management unit 122, the product ID of the product may be temporarily stored in a memory (such as a random access memory (RAM) 503 in FIG. 9 to be described later), and when the product is specified by the registration unit 111, a text such as "Expired product. Not possible to sell." or a screen thereof may be displayed on a display (output device 501 in FIG. 9 described later) or the like of the POS device 110, so as to prevent this product from being registered.

The settlement unit 112 performs a settlement of a product purchased by a customer. Here, the settlement unit 112 processes a payment of the price of the registered product using cash, electronic money, a credit card, two-dimensional code payment, bar code payment, or the like. For example, the settlement unit 112 acquires information of a credit card or electronic money in a magnetic form or a contactless IC card form presented by the customer by the card reader-writer 118 connected to the POS device 110, and processes the payment. The settlement unit 112 may process the payment by acquiring information of a two-dimensional code or a barcode displayed on a payment application operating on a terminal of the customer by the camera 115 or the barcode reader 116. The settlement unit 112 may specify the customer by face image authentication using a face image of the customer acquired by the camera 115 or the camera 140, and process the payment using electronic money, a credit card, a bank account, or the like registered in advance in association with the customer. In this case, the settlement unit 112 may specify a member by, for example, checking the feature amount of a face image with the feature amount of a face image registered in advance in association with the member ID of the chain. The settlement unit 112 may specify the member by another biometric authentication means such as iris authentication, fingerprint authentication, or vein authentication. The settlement unit 112 generates purchase information for each settlement as a unit. The purchase information is procurement information of the customer for describing on a receipt generated by a general POS device 110. The purchase information includes, for example, a customer ID, a settlement date and time, a purchased product, a product amount, and a total purchase amount. The settlement unit 112 transmits the purchase information generated for each settlement to the transmission unit 114.

The specification unit 113 specifies a customer ID for identifying the customer who purchases a product. For example, the specification unit 113 acquires a member (customer) ID from a membership card in a magnetic form or a contactless IC card form presented by the customer by the card reader-writer 118. The specification unit 113 may acquire the member ID from a barcode or a two-dimensional code displayed in a member application operating on a terminal of the customer by the camera 115 or the barcode reader 116. The specification unit 113 may specify the member ID by biometric authentication means such as face image authentication using the face image of the customer described above. The specification unit 113 delivers the specified customer ID to the settlement unit 112. The settlement unit 112 may describe the customer ID on the receipt. Cumulative points associated with the customer ID (cumulative value of points granted according to the procurement amount) may be described on the receipt.

Upon receiving the purchase information from the settlement unit 112, the transmission unit 114 transmits the purchase information to the store server 120.

The store server 120 includes an inventory storage unit 121, an inventory management unit 122, a generation unit 123, a timing setting unit 124, a notification unit 125, a movement storage unit 126, and a processing time storage unit 127. The store server 120 of the flagship store is also referred to as a first server, and the store server 120 of the branch store is also referred to as a second server.

The inventory storage unit 121 stores inventory information. The inventory information includes at least IDs for identifying a plurality of products sold in each store, respective sell-by dates of the products, and respective stock quantities of the products. For example, as illustrated in FIG. 3, the inventory information includes a product ID, a total stock quantity, a first sell-by date and a stock quantity thereof, and a second sell-by date and a stock quantity thereof. Even in a case of the same product, product shelves may include products with different sell-by dates. For example, in a case of bread, since products with different sell-by dates are displayed in a mixed manner, a first sell-by date and a second sell-by date are set in order to manage the stock quantity for every sell-by date. FIG. 3 illustrates that, assuming that the product ID "D" is jam bread, a total of 10 products of five products with the first sell-by date (2019 Mar. 1 12:00) and five products with the second sell-by date (2019 Mar. 2 12:00) are displayed as a stock on the product shelf. In FIG. 3, there are two sell-by dates (the first sell-by date and the second sell-by date), but the number of sell-by dates is not limited to this, and may be only the first sell-by date or may include the third sell-by date.

The movement storage unit 126 stores a movement distance or a movement time of the employee among the stores 1A to 1C. Here, the movement distance is a movement distance in a three-dimensional vector space including latitude, longitude, and altitude. That is, a movement from the first floor to the tenth floor and a movement from the twentieth floor to the first floor in the same building are also targets of comparison. The movement time is a time needed for movement in a three-dimensional vector space.

The processing time storage unit 127 stores times required for work processing of each of a plurality of employees, for example, stock replenishment, product replacement, and the like. This is because although they are employees, a time required for work is different between an expert and a new worker.

When a product is purchased through the POS device 110, the inventory management unit 122 updates the inventory information of the product. Specifically, when the store server 120 receives the purchase information from the transmission unit 114 of the POS device 110, the inventory management unit 122 updates the inventory information on the basis of the purchase information. For example, when the stock quantity of a certain product is five and the purchase quantity is one, a value obtained by subtracting the purchase quantity from the stock quantity, that is, four is registered in the inventory storage unit 121 as inventory information as a new stock quantity. The purchase information includes at least a branch store ID capable of specifying a branch store, a product ID, and the number of products purchased. Further, the inventory management unit 122 manages the stock quantity of the product whose sell-by date is close. The closeness of the sell-by date can be set for each product. For example, the inventory management unit 122 notifies the generation unit 123 of an expiration schedule notification indicating that the sell-by date is approaching a predetermined time (for example, one hour) before the sell-by date of a certain product. When the sell-by date of a certain product has expired, the inventory management unit 122 notifies the POS terminal 110 of a notification that the product is expired. The POS terminal 110 that has received the notification notifies the customer that the product is expired through a display, a speaker (both not illustrated), or the like, and alerts the customer not to purchase the product.

Upon receiving the expiration schedule notification from the inventory management unit 122, the generation unit 123 generates expiration information including information for specifying the product and information for specifying the branch store that sells the product on the basis of the stock quantity of the product in the branch store and the sell-by date of the product stored in the inventory storage unit 121. Upon receiving a notification from the inventory management unit 122 that the sell-by date of a certain product in the branch store will pass within a predetermined time, the generation unit 123 generates expiration information including information for specifying the product and information for specifying the branch store that sells the product. The generation unit 123 does not generate the expiration information in a case of a product with a stock quantity of zero. The generation unit 123 transmits the expiration information to the store terminals 130a to 130c and the like via the notification unit 125.

Specifically, as illustrated in FIG. 3, it is assumed that the first sell-by date of the product with the product ID "D" of the store 1A is 12 o'clock on 2019 Mar. 1 and an expiration schedule notification is received from the inventory management unit 122 at 11 o'clock. At this time, while it is necessary to replace five products with the product ID "D" having the first sell-by date of the store 1A, by referring to FIG. 3, there are 15 products with the product ID "D" having the second sell-by date (12 o'clock on 2019 Mar. 2) in stock in the store 1B, and thus the generation unit 123 determines that it is appropriate to move five products with the product ID "D" having the second sell-by date from the store 1B to the store 1A. The generation unit 123 generates expiration information describing that five products with the product ID "D" having the second sell-by date are to be moved from the store 1B to the store 1A.

In FIG. 3, the number of stocks of the product ID "D" with the second sell-by date is 15, which is sufficient for the stock replenishment (five), and thus the store 1B is selected. However, for a certain product, the stock quantities of the flagship store and the plurality of branch stores may not exceed a predetermined number (for example, five). In such a case, the generation unit 123 may select one of the flagship store or the plurality of branch stores on the basis of the movement distance or the movement time necessary for moving from one to another, and generate the expiration information including information for specifying the selected flagship store or branch store. That is, if the stock quantities of a neighboring flagship store or branch store is about the same, the generation unit 123 may select a neighboring flagship store or branch store close to the store as a store whose stock is to be moved.

A position-identifiable device of GPS, WiFi (registered trademark), or the like may be mounted on the store terminal 130a to 130c, and a movement distance or a movement time from the current position of the employee who holds the store terminal 130a to 130c to the branch store 1A may be measured. For example, when the movement distance (movement time) is shorter from the store 1B to the store 1A, but the employee (store terminal 130a to 130c) is in the flagship store 1C and the total movement distance of the employees is shorter from the store 1C to the store 1A, the expiration information may be presented so as to replace the product from the store 1C to the store 1A.

The timing setting unit 124 sets a timing to transmit the expiration information to the store terminal held by the employee on the basis of at least either the movement time or the movement distance to the branch store related to the information (store ID) for specifying the branch store that sells the product from the current position of the employee acquired from the movement storage unit 126, and the sell-by date related to the information (product ID) for specifying the product. The timing setting unit 124 sets a timing to transmit the expiration information to the store terminal of the employee on the basis of the time required for moving from the position of the employee to the branch store and the time of the sell-by date acquired from the movement storage unit 126.

The timing setting unit 124 may set the timing to transmit the expiration information to the store terminal of the employee on the basis of the movement time acquired from the movement storage unit 126, the time required for replacing the product associated with the employee who moves for stock replacement acquired from the processing time storage unit 127, and the time of the sell-by date. The time required for replacing the product associated with the employee may be a time set according to the skill level of the employee, or may be a measured time in the previous work.

The notification unit 125 notifies the store terminal 130a of the expiration information generated by the generation unit 123 at the timing set by the timing setting unit 124. Usually, within a predetermined time thereafter, the notification unit 125 receives a reply indicating to leave for product replacement from the store terminal 130a that has been notified of the expiration information. When there is no reply within the predetermined time indicating to leave for product replacement from the store terminal 130a that has been notified of the expiration information, the notification unit 125 may notify a store terminal (for example, 130b, 130c) other than the store terminal of the expiration information. The expiration information may be transmitted to all the store terminals 130a to 130c to prompt the employees to replace the product, or may be transmitted only to the specific store terminal 130a. The display units of the store terminals 130a to 130c present the expiration information to the employees, and the employee who has browsed the expired information executes the product replacement. Along with the completion of the product replacement, the employee inputs an indication to update the data of the inventory information (see FIG. 3 and the like) via the store terminal 130a to 130c. Upon receiving the input, the inventory management unit 122 of the store server 120 updates the data of the inventory information.

Operation of Inventory Management System

An operation of the first example embodiment will be described.

Figure 4:
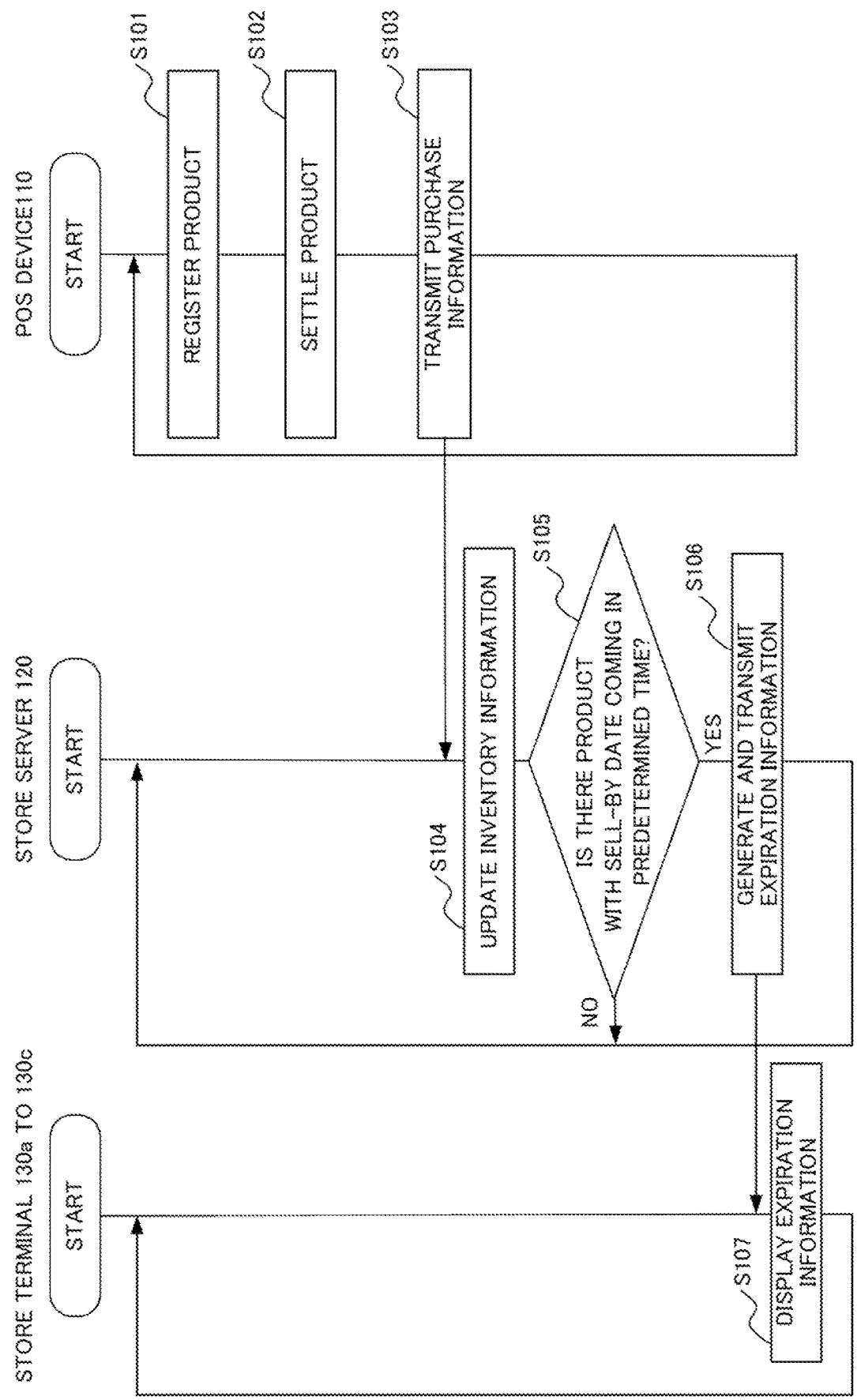
FIG. 4 is a flowchart illustrating an example of an operation of the inventory management system in the first example embodiment.

FIG. 4 is a flowchart illustrating inventory management processing according to the first example embodiment. The inventory management processing is executed, for example, every time a customer purchases a product at each store 1.

The registration unit 111 of the POS device 110 in the store system 100 in each store 1 registers a product to be purchased by a customer (step S101). The settlement unit 112 performs a settlement of a product purchased by a customer (step S102). The transmission unit 114 transmits the purchase information to the store server 120 (step S103).

The inventory management unit 122 of the store server 120 updates the inventory information of the own store 1 in the inventory storage unit 121 on the basis of the received purchase information (step S104). The inventory management unit 122 determines whether there is an expired product as a result of the update (step S105). When there is an expired product, the inventory management unit 122 transmits an expiration schedule notification to the generation unit 123. Upon receiving the expiration schedule notification, the generation unit 123 generates expiration information including at least the branch store ID having the expired product, the product ID, and the stock quantity of the product. The notification unit 125 transmits the generated expiration information to the store terminals 130a to 130c (step S106).

The store terminals 130a to 130c display the received expiration information on the display unit, and prompt the employee to replace the stock product (step S107).

Thus, the operation of the first example embodiment is completed.

Modification Example

In step S107, when the expiration information is transmitted to the specific store terminal 130a and a reply is not received within a predetermined time, the notification unit 125 may notify a store terminal (for example, 130b, 130c) other than the store terminal of stock shortage information. In step S107, the expiration information may be transmitted to all the store terminals 130a to 130c, and a reply indicating to leave for product replacement may be received from any of the store terminals 130a to 130c.

Effect of First Example Embodiment

According to the first example embodiment, inventory management can be efficiently performed in a specific store such as a labor-saving store. A reason thereof is that the timing setting unit 124 sets the timing to transmit the expiration information generated by the generation unit 123 to the store terminals 130a to 130c on the basis of the movement time (or the movement distance) of the employee and the sell-by date of the product, and the notification unit 125 notifies the store terminals 130a to 130c of the expiration information at the set timing.

A further reason is that the store terminals 130a to 130c display the received expiration information to prompt the employees to perform product replacement.

Second Example Embodiment

In the first example embodiment, it is assumed that the employee moves from the flagship store to the branch store. However, in some cases, the employee needs to visit a plurality of branch stores from the flagship store to perform product replacement. In a second example embodiment, a method will be described for supporting the product replacement of an employee by presenting a visiting route or the like when the employee visits the plurality of branch stores from the flagship store to perform product replacement as described above.

Figure 5:
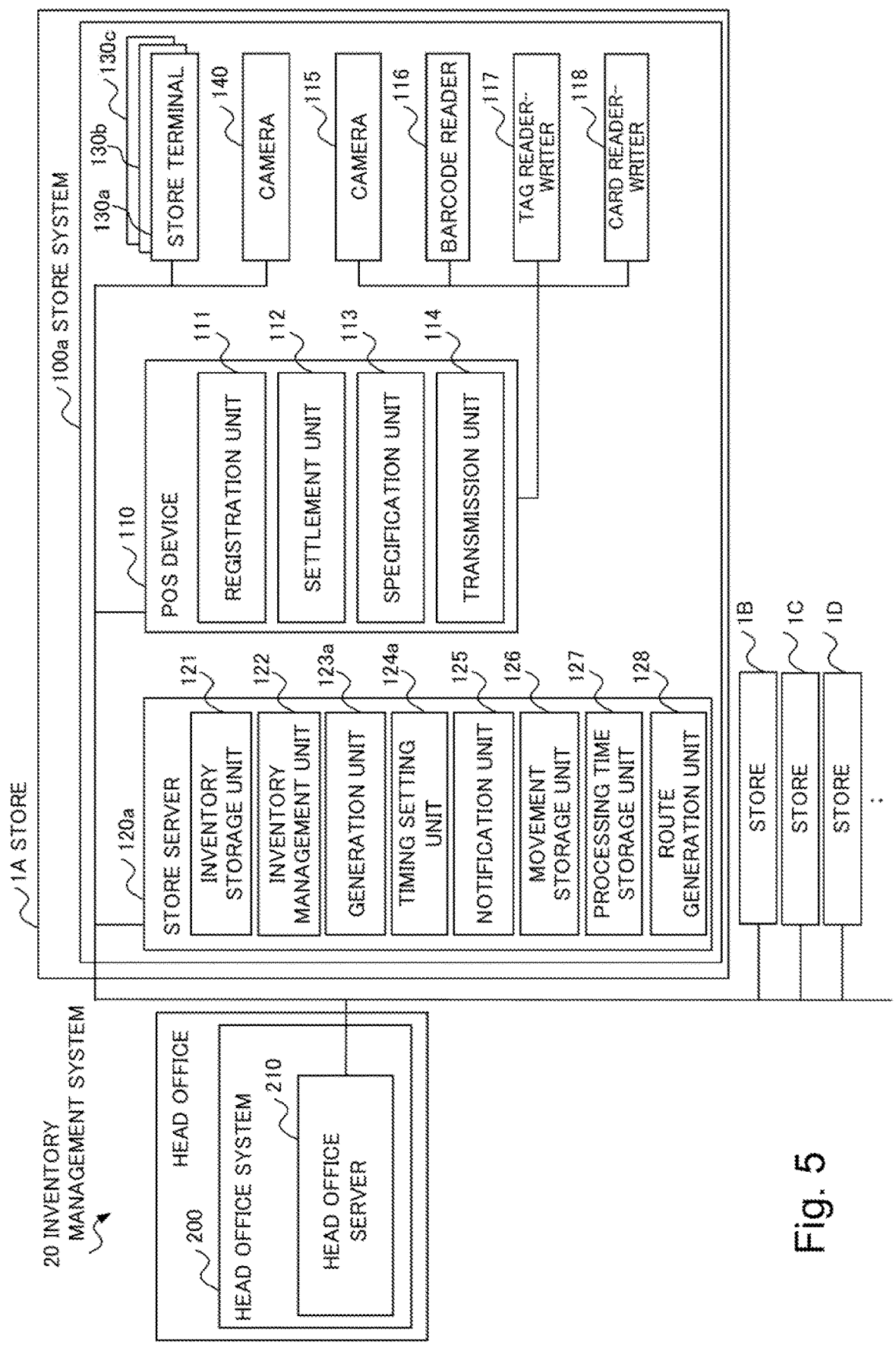
FIG. 5 is a block diagram illustrating a configuration of an inventory management system in a second example embodiment.

The second example embodiment will be described. As illustrated in FIG. 5, the inventory management system 20 according to the second example embodiment includes a plurality of store systems 100a, and each store system 100a includes a POS device 110, a store server (inventory management server) 120a, store terminals 130a to 130c, and a camera 140.

The store server 120a includes an inventory storage unit 121, an inventory management unit 122, a generation unit 123a, a timing setting unit 124a, a notification unit 125, a movement storage unit 126, a processing time storage unit 127, and a route generation unit 128.

It is assumed that, as a result of the inventory update on the basis of customer purchase, it is determined that there is a product whose sell-by date is within a predetermined time. In this case, the generation unit 123a generates expiration information including at least a branch store ID having an expired product, the product ID, and the stock quantity of the product. The route generation unit 128 generates a route (shortest route) that minimizes the movement time of an employee to the plurality of branch stores. The shortest route can be calculated using Dijkstra's algorithm or the like. In a case of receiving a notification indicating that the sell-by date of a certain product will pass within a predetermined time from the inventory management unit 122 in the plurality of branch stores, the route generation unit 128 generates the route. The route generation unit 128 transmits the generated route information to the store terminals 130a to 130c via the notification unit 125. In the generation of the route, the route generation unit 128 may generate the route in the order of information other than the movement time, for example, in ascending order of movement distance, in the order of stores in descending order of expired products, or in the order of stores in ascending order of expired products. Other devices and units are similar to those in the first example embodiment (see FIG. 1).

Operation of Inventory Management System

An operation of the second example embodiment will be described.

Figure 6:
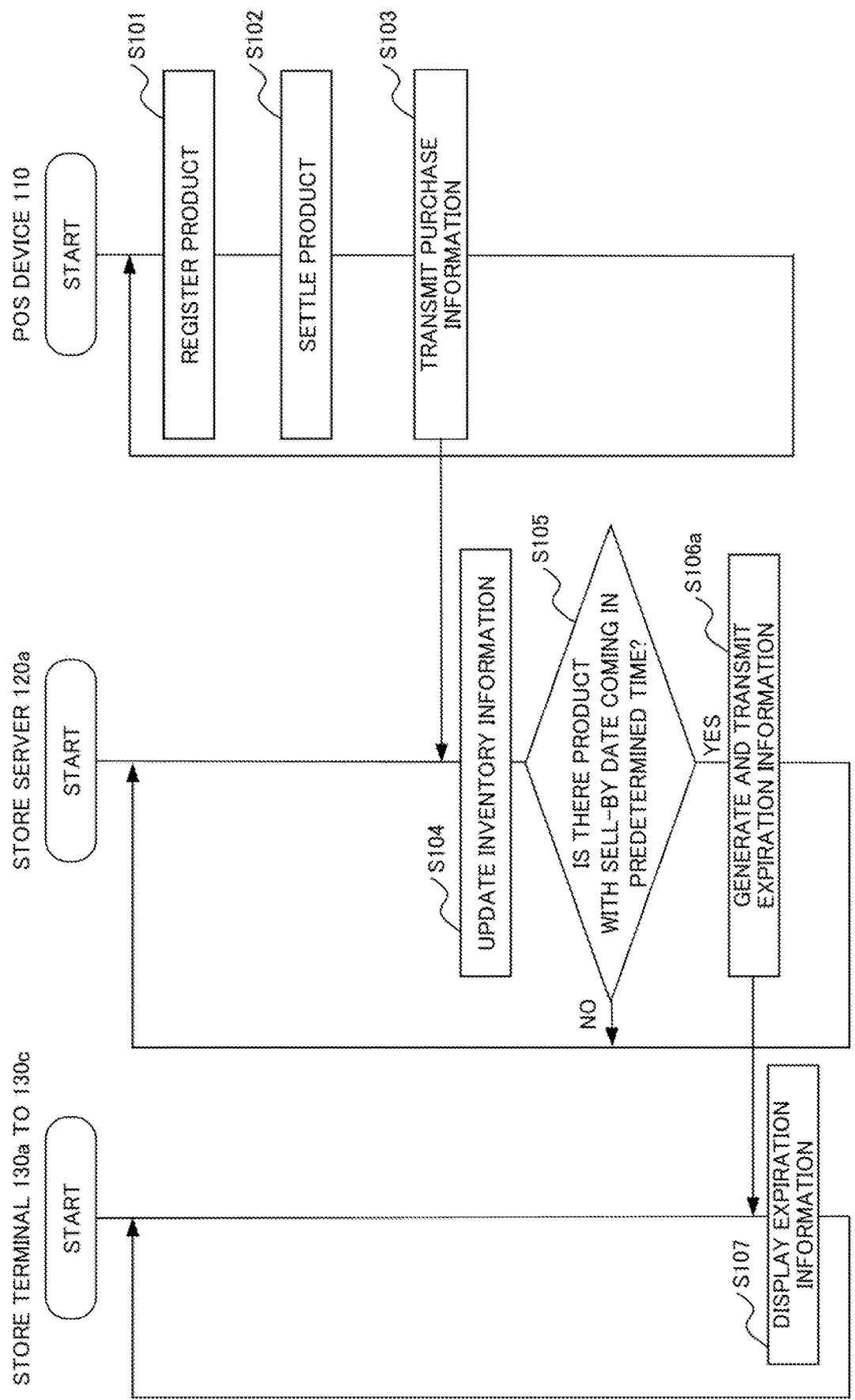
FIG. 6 is a flowchart illustrating an example of an operation of the inventory management system in the second example embodiment.

FIG. 6 is a flowchart illustrating inventory management processing in the second example embodiment. The inventory management processing is executed, for example, every time a customer purchases a product at each store 1.

Steps S101 to 105 are similar to those in the first example embodiment (see FIG. 4).

When there is an expired product as a result of updating the inventory information in the inventory storage unit 121 on the basis of purchase information, the inventory management unit 122 of the store server 120 transmits an expiration schedule notification to the generation unit 123a. In step S106a, the generation unit 123a that has received the expiration schedule notification generates expiration information including at least the branch store ID having the expired product, the product ID, and the stock quantity of the product. On the basis of the movement distance and the movement time stored in the movement storage unit 126, the route generation unit 128 generates a route that minimizes the movement time or the movement distance for the employee to visit the plurality of branch stores from the flagship store. The notification unit 125 transmits the expiration information including the route to the store terminals 130a to 130c.

Step S107 is similar to that in the first example embodiment (see FIG. 4).

Thus, the operation of the second example embodiment is completed.

Modification Example

Figure 7:
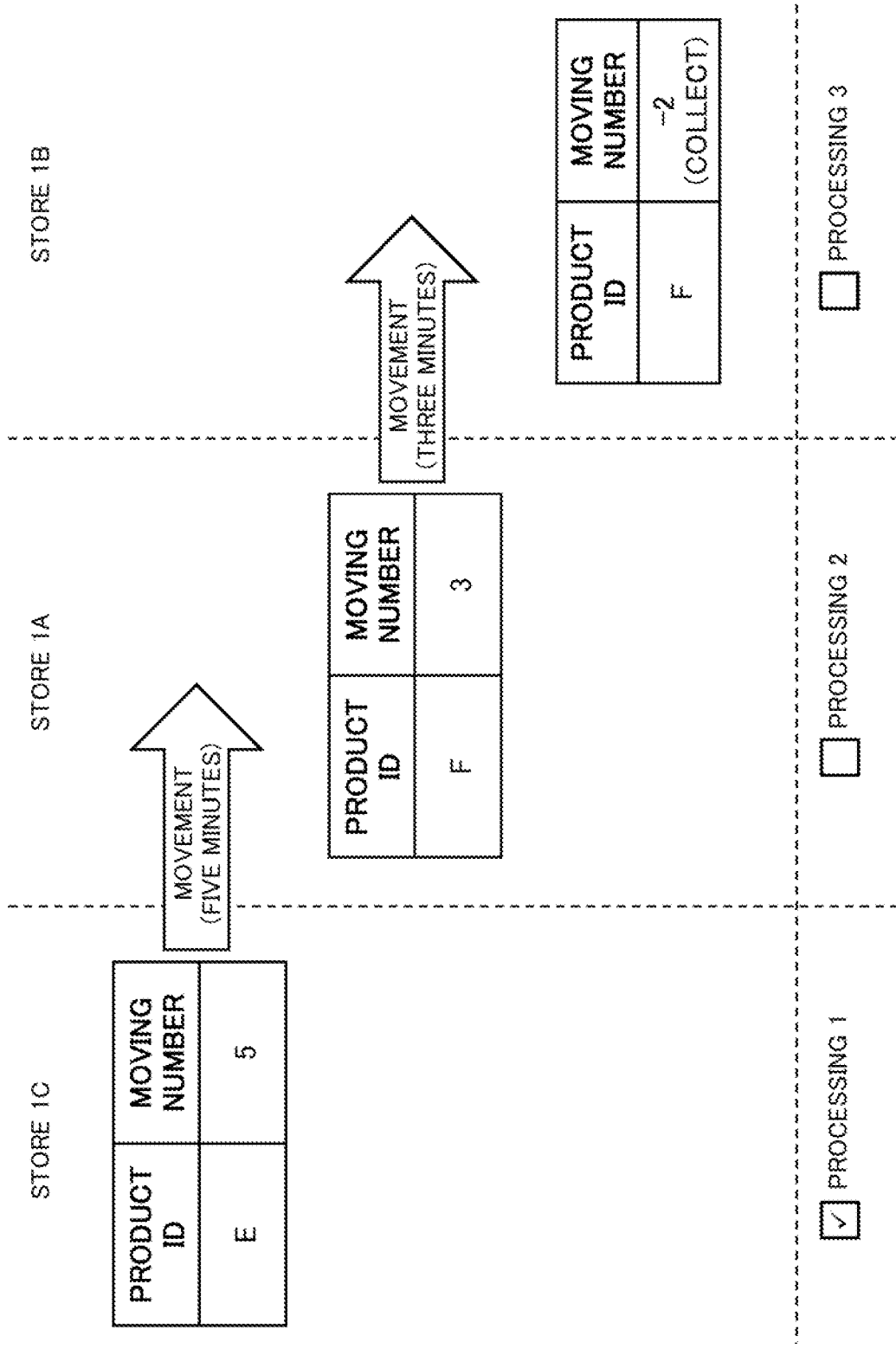
FIG. 7 is a diagram illustrating an example of information of a route generated by a route generation unit.

FIG. 7 illustrates an example in which the route generation unit 128 generates a route with the shortest movement (five minutes) from the store 1C to the store 1A and the shortest movement (three minutes) from the store 1A to the store 1B when moving from the store 1C as the flagship store to the stores 1A and 1B as the branch stores. In this case, there are processing 1 in the store 1C, processing 2 in the store 1A, and processing 3 in the store 1B. The processing 1 is processing of moving five products with a product ID "E" from the store 1C to the store 1A. The processing 2 is processing of moving three products with a product ID "F" from the store 1A to the store 1B. The processing 3 is processing of collecting two products with a product ID "F" from the store 1B to the store 1C. The products to be collected are about to expire. When the processing 1 to 3 in the store terminals 130a to 130c is completed, check boxes as illustrated in FIG. 7 are displayed on the store terminals 130a to 130c to prompt the employee to perform input indicating processing completion.

In FIG. 7, the processing 1 is completed, but the processing 2 and the processing 3 are not completed. It is assumed that the store server 120a receives a notification from the store terminal 130a that the employee in charge of the processing in this state cannot continue the processing for some reason. In this case, the route generation unit 128 of the store server 120a generates, for a second employee different from a first employee associated with the first store terminal 130a, routes to a plurality of stores (store 1A, store 1B) other than the store (store 1C) at which the first employee has already replaced the product. Thereafter, the timing setting unit 124a sets a timing to transmit the expiration information to the store terminals 130b and 130c (second store terminals) other than the first store terminal on the basis of at least either the movement time or the movement distance to the plurality of stores, the time required for replacing the product associated with the second employee, and the time of the sell-by date. The notification unit 125 notifies the second store terminal of the expiration information including the information indicating the routes at the set timing. At a time point when the first employee can no longer work, the inventory management unit 122 updates data of the inventory information in the inventory storage unit 121. Next, when the second employee is determined, the route generation unit 128 generates data of the route (see FIG. 7) for the second employee again, and when work by the second employee is completed, the inventory management unit 122 updates the data of the inventory information in the inventory storage unit 121 again.

Effect of Second Example Embodiment

According to the second example embodiment, inventory management can be efficiently performed in a specific store such as a labor-saving store. A reason thereof is that the route generation unit 128 generates a route for visiting each store at the shortest time in a case where product replacement in the plurality of stores 1A to 1C is necessary. Even in a case where the employee who performs the product replacement is replaced, the processing is requested to the subsequent employee only for the store other than the store where the processing has already been completed.

Third Example Embodiment

A third example embodiment will be described.

Figure 8:
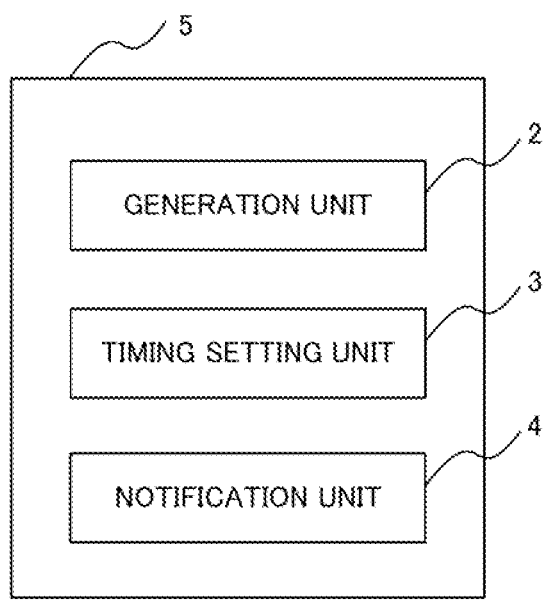
FIG. 8 is a block diagram illustrating a configuration of an inventory management server in a third example embodiment.

FIG. 8 is a block diagram illustrating a configuration of the inventory management server 5 in the third example embodiment. The inventory management server 5 includes a generation unit 2, a timing setting unit 3, and a notification unit 4. The generation unit 2, the timing setting unit 3, and the notification unit 4 are example embodiments of a generation means, a timing setting means, and a notification means, respectively.

The generation unit 2 generates expiration information including information for specifying a product and information for specifying a branch store that sells the product on the basis of the stock quantity of the product in the branch store in which an employee of a flagship store replaces a plurality of products and sell-by date of the product. The timing setting unit 3 sets a timing to transmit the expiration information to a store terminal on the basis of at least either a movement time or a movement distance from a position of the employee to the branch store that sells the product, and the sell-by date related to the product. The notification unit 4 notifies the store terminal of the expiration information on the basis of the set timing.

An effect of the second example embodiment will be described.

According to the second example embodiment, inventory management can be efficiently performed in a specific store such as a labor-saving store. A reason thereof is that the generation unit 2 generates expiration information, the timing setting unit 3 sets a timing to transmit the expiration information to the store terminal used by the employee on the basis of at least either the movement time or the movement distance from the position of the employee to the branch store that needs stock replacement and the sell-by date related to the product, and the notification unit 4 notifies the store terminal of the expiration information at the set timing.

Hardware Configuration Example

In each of the above-described example embodiments, the components of each device (POS device 110, store server 120, store terminals 130a to 130c, or the like) indicate blocks of functional units. Some or all of the components of each device may be achieved by any combination of a computer 500 and a program.

Figure 9:
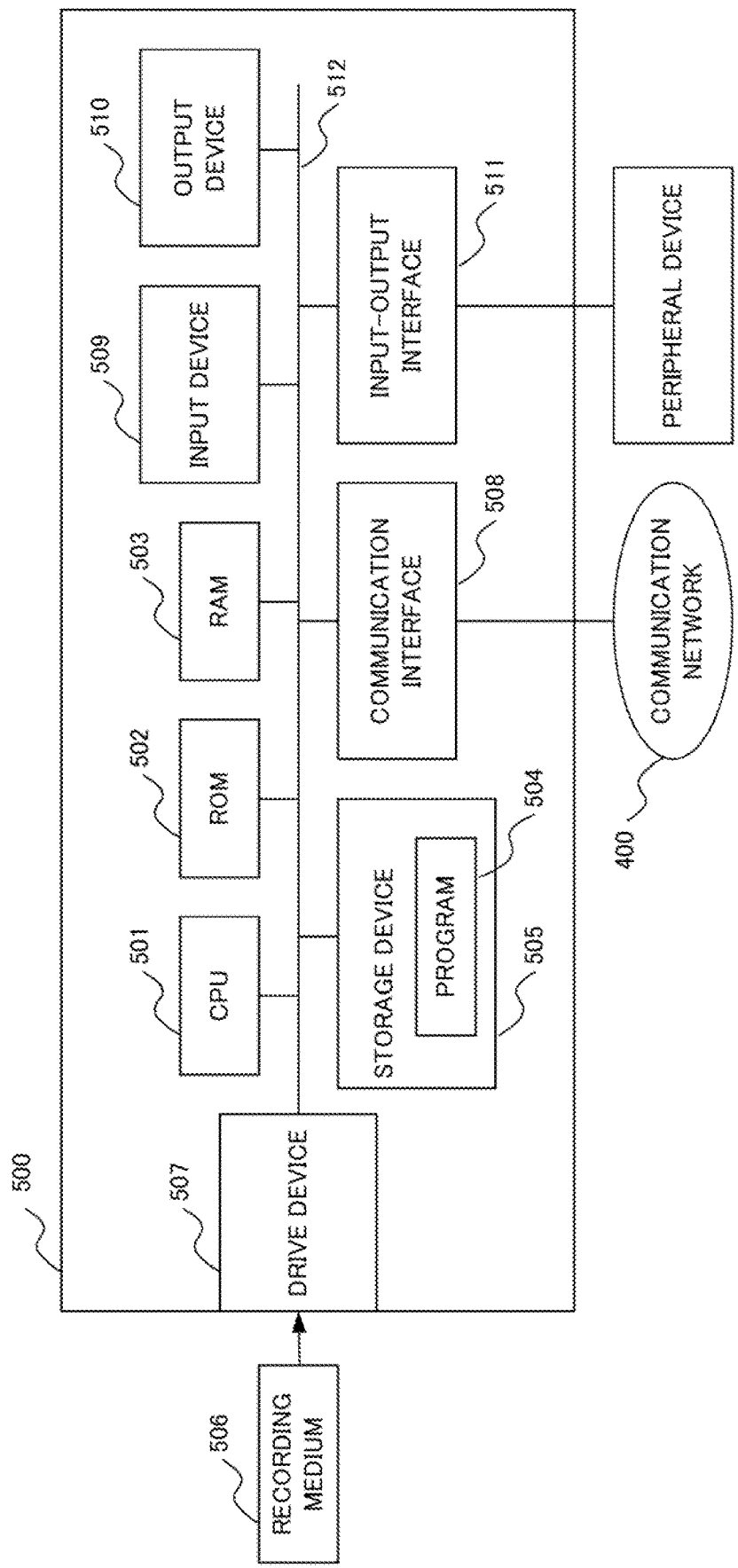
FIG. 9 is a block diagram illustrating an example of a hardware configuration of a computer.

FIG. 9 is a block diagram illustrating an example of a hardware configuration of the computer 500. Referring to FIG. 9, the computer 500 includes, for example, a central processing unit (CPU) 501, a read only memory (ROM) 502, a random access memory (RAM) 503, a program 504, a storage device 505, a drive device 507, a communication interface 508, an input device 509, an output device 510, an input-output interface 511, and a bus 512.

The program 504 includes instructions for achieving the functions of each device. The program 504 is stored in advance in the ROM 502, the RAM 503, and/or the storage device 505. The CPU 501 achieves the functions of each device by executing instructions included in the program 504. For example, the CPU 501 of the store server 120 executes instructions included in the program 504 to implement the functions of the inventory management unit 122, the generation unit 123, and the notification unit 125. The RAM 503 may store data to be processed in the functions of each device. For example, the RAM 503 of the store server 120 may store data of the inventory storage unit 121 and the movement storage unit 126.

The drive device 507 reads and/or writes on the recording medium 506. The communication interface 508 provides an interface with a communication network. The input device 509 includes, for example, a mouse, a keyboard, and/or the like, and receives an input of information from an administrator or the like. The output device 510 is, for example, a display and outputs (displays) information to an administrator or the like. The input-output interface 511 provides an interface with a peripheral device. In a case of the POS device 110, the camera 115, the barcode reader 116, the tag reader-writer 117, and the card reader-writer 118 described above are connected to the input-output interface 511. The bus 512 connects these hardware components. The program 504 may be supplied to the CPU 501 via a communication network, or may be stored in the recording medium 506 in advance, read by the drive device 507, and supplied to the CPU 501.

The hardware configuration illustrated in FIG. 9 is an example, and other components may be added or some components may not be included.

There are various modification examples of the implementation method of each device. For example, each device may be achieved by any combination of a computer and a program different for each of the components. A plurality of components included in each device may be achieved by any combination of one computer and a program.

Some or all of the components of each device may be achieved by general-purpose or dedicated circuitry including a processor or the like, or a combination thereof. These circuits may be configured by a single chip or may be configured by a plurality of chips connected via a bus. Some or all of the components of each device may be achieved by a combination of the above-described circuit or the like and a program.

In a case where some or all of the components of each device is achieved by a plurality of computers, circuits, and the like, the plurality of computers, circuits, and the like may be arranged in a centralized manner or in a distributed manner.

The store server 120 may be arranged in the store 1, or may be disposed in a place different from the store 1 and connected to the POS 110 and the store terminals 130a to 130c via a communication network. That is, the store server 120 may be achieved by a cloud computing system. Similarly, the head office server 210 may also be achieved by a cloud computing system.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. The configurations in the example embodiments can be combined with each other without departing from the scope of the present disclosure.

Some or all of the example embodiments described above may also be described as in the following supplementary notes, but are not limited to the following.

[Supplementary Note 1]

An inventory management server including:
a generation unit that generates expiration information including information for specifying a product and information for specifying a branch store that sells the product based on a stock quantity of the product in the branch store in which an employee of a flagship store replaces a plurality of products and a sell-by date of the product;
a timing setting unit that sets a timing to transmit the expiration information to a store terminal based on at least either a movement time or a movement distance from a position of the employee to the branch store that sells the product, and the sell-by date related to the product; and
a notification unit that notifies the store terminal of the expiration information based on the set timing.

[Supplementary Note 2]

The inventory management server according to supplementary note 1, in which the timing setting unit that sets a timing at which the expiration information is transmitted to the store terminal based on at least either the movement time or the movement distance, a time required for replacing the product associated with the employee, and a time of the sell-by date.

[Supplementary Note 3]

The inventory management server according to supplementary note 1 or 2, further including a route generation unit that generates a route on which the employee moves among a plurality of the branch stores in the plurality of the branch stores,
in which the timing setting unit that sets a timing to transmit the expiration information to the store terminal based on at least either the movement time or the movement distance to the plurality of the branch stores, a time required for the employee to replace the product, and a time of the sell-by date, and
the notification unit that notifies at the set timing the store terminal of the expiration information including information indicating the route.

[Supplementary Note 4]

The inventory management server according to any one of supplementary notes 1 to 3, in which
a plurality of the store terminals is present, and
the notification unit that notifies a store terminal other than the store terminal of the expiration information when there is no reply for a predetermined time from the store terminal that has been notified of the expiration information.

[Supplementary Note 5]

The inventory management server according to any one of supplementary notes 1 to 4, in which
a plurality of the store terminals is present, and
the notification unit that notifies a store terminal other than the store terminal of the expiration information when receiving a notification of response impossibility from the store terminal that has been notified of the expiration information.

[Supplementary Note 6]

The inventory management server according to supplementary note 4 or 5, in which
the route generation unit that generates, for a second employee different from a first employee associated with a first store terminal, routes to a plurality of branch stores other than a branch store for which the first employee has already replaced the product, and
the timing setting unit that sets a timing to transmit the expiration information to a second store terminal based on at least either the movement time or the movement distance to the plurality of branch stores, a time required for replacing the product associated with the second employee, and a time of the sell-by date, and
the notification unit that notifies at the set timing the second store terminal of the expiration information including information indicating the routes.

[Supplementary Note 7]

The inventory management server according to any one of supplementary notes 1 to 3 and 6, in which the movement distance is a distance in a three-dimensional vector space.

[Supplementary Note 8]

An inventory management system including:
a first server that manages an inventory of a flagship store;
a second server that manages an inventory of a branch store in which an employee of the flagship store replaces a plurality of products; and
a store terminal,
in which the second server is communicably connected to the store terminal, and
the second server includes a generation unit that generates expiration information including information for specifying a product and information for specifying a branch store that sells the product based on a stock quantity of the product in the branch store in which the employee of the flagship store replaces a plurality of products and a sell-by date of the product, a timing setting unit that sets a timing to transmit the expiration information to a store terminal based on at least either a movement time or a movement distance from a position of the employee to the branch store that sells the product, and the sell-by date related to the product, and a notification unit that notifies the store terminal of the expiration information based on the set timing.

[Supplementary Note 9]

An inventory management method including:
generating expiration information including information for specifying a product and information for specifying a branch store that sells the product based on a stock quantity of the product in the branch store in which an employee of a flagship store replaces a plurality of products and a sell-by date of the product;
setting a timing to transmit the expiration information to a store terminal based on at least either a movement time or a movement distance from a position of the employee to the branch store that sells the product, and the sell-by date related to the product; and
notifying the store terminal of the expiration information based on the set timing.

[Supplementary Note 10]

A recording medium storing an inventory management program for causing a computer to execute:
generating expiration information including information for specifying a product and information for specifying a branch store that sells the product based on a stock quantity of the product in the branch store in which an employee of a flagship store replaces a plurality of products and a sell-by date of the product;

setting a timing to transmit the expiration information to a store terminal based on at least either a movement time or a movement distance from a position of the employee to the branch store that sells the product, and the sell-by date related to the product; and notifying the store terminal of the expiration information based on the set timing.

This application is based upon and claims the benefit of priority from Japanese patent application No. 2019-054690, filed on Mar. 22, 2019, the disclosure of which is incorporated herein in its entirety by reference.

REFERENCE SIGNS LIST

1 Store
1A Branch store
1B Branch store
1C Flagship store
2 Generation unit
3 Timing setting unit
4 Notification unit
5 Inventory management server
100 Store system
100a Store system
110 POS device
111 Registration unit
112 Settlement unit
113 Specification unit
114 Transmission unit
115 Camera
116 Barcode reader
117 Tag reader-writer
118 Card reader-writer
120 Store server (inventory management server)
120a Store server (inventory management server)
121 Inventory storage unit
122 Inventory management unit
123 Generation unit
123a Generation unit
124 Timing setting unit
124a Timing setting unit
125 Notification unit
126 Movement storage unit
127 Processing time storage unit
128 Route generation unit
130a Store terminal
130b Store terminal
130c Store terminal
140 Camera
200 Head office system
210 Head office server
500 Computer
501 CPU
502 ROM
503 RAM
504 Program
505 Storage device
506 Recording medium
507 Drive device
508 Communication interface
509 Input device
510 Output device
511 Input-output interface
512 Bus

What is claimed is:

1. An inventory management server comprising:
a memory; and
at least one processor coupled to the memory,
the at least one processor performing operations to:
generate expiration information including information for specifying a product and information for specifying a given branch store of a plurality of branch stores at which the product is sold based on an inventory of the product in the given branch store to which an employee of a flagship store travels and at which the employee replenishes an inventory of the product and based on a sell-by date of the product;
generate a route on which the employee moves among the plurality of branch stores;
set a timing to transmit the expiration information to a store terminal of the employee based on at least either a movement time or a movement distance from a current position of the employee to the given branch store, a time required for the employee to replace the product in the given branch store, and a time of the sell-by date related to the product; and
transmit to the store terminal of the employee, at the set timing, the expiration information and information indicating the route.

2. The inventory management server according to claim 1, wherein
the store terminal of the employee is one of a plurality of the store terminals at the flagship store, and
wherein the at least one processor is further configured to execute the instructions to transmit the expiration information and the information regarding the route to one of the store terminals at the flagship store other than the store terminal of the employee expiration information when there is no reply for a predetermined time from the store terminal of the employee after transmittal of the expiration information and the information regarding the route to the store terminal of the employee.

3. The inventory management server according to claim 1, wherein
the store terminal of the employee is one of a plurality of the store terminals at the flagship store, and
wherein the at least one processor is further configured to execute the instructions to transmit the expiration information and the information regarding the route to one of the store terminals at the flagship store other than the store terminal of the employee expiration information in response to receiving a response from the store terminal of the employee that the employee will be unable to replenish the inventory of the product.

4. The inventory management server according to claim 1, wherein the employee is a first employee, the route is a first route, the plurality of branch stores is a first plurality of branch stores, the given branch store is a first given branch store, and the at least one processor is further configured to execute the instructions to:
generate, for a second employee of the flagship store, a second route to a second plurality of branch stores that does not include any a branch store at which the first employee has already replenished the inventory of the product;
set a second timing to transmit the expiration information to a second store terminal of the second employee based on at least either a movement time or a movement distance from a current position of the employee to a second given branch store of the second plurality of branch stores, a time required for the second employee to replace the product in the second given branch store, and the time of the sell-by date; and transmit to the second store terminal of the second employee, at the notify at the set second timing, the expiration information and information indicating the second route.

5. The inventory management server according to claim 1, wherein the movement distance is a distance in a three-dimensional vector space.

6. An inventory management system comprising:
a first server that manages an inventory of a flagship store;
a second server that manages an inventory of a given branch store of a plurality of stores at which a product is sold and to which an employee of the flagship travels and at which the employee replenishes an inventory of the product; and
a store terminal of the employee to which the second server is communicatively connected, wherein
the second server comprises:
a memory; and
at least one processor coupled to the memory,
the at least one processor performing operations to:
generate expiration information including information for specifying the product and information for specifying the given branch store based on an inventory of the product in the given branch store and based on a sell-by date of the product;
generate a route on which the employee moves among the plurality of branch stores;
set a timing to transmit the expiration information to a store terminal of the employee based on at least either a movement time or a movement distance from a current position of the employee to the given branch store, a time required for the employee to replace the product in the given branch store, and a time of the sell-by date related to the product; and
transmit to the store terminal of the employee, at the set timing, the expiration information and information indicating the route.

7. An inventory management method comprising:
generating, by a processor, expiration information including information for specifying a product and information for specifying a given branch store of a plurality of branch stores at which the product is sold based on an inventory of the product in the given branch store to which an employee of a flagship store travels and at which the employee replenishes an inventory of the product and based on a sell-by date of the product;
generating, by the processor, a route on which the employee moves among the plurality of branch stores;
setting, by the processor, a timing to transmit the expiration information to a store terminal of the employee based on at least either a movement time or a movement distance from a current position of the employee to the given branch store, a time required for the employee to replace the product in the given branch store, and a time of the sell-by date related to the product; and
transmitting, by the processor and to the store terminal of the employee, at the set timing, the expiration information and information indicating the route.

* * * * *